(12) United States Patent
Gong

(10) Patent No.: US 7,080,396 B2
(45) Date of Patent: Jul. 18, 2006

(54) EVENT OVERRUN AND DOWNSTREAM EVENT SHIFT TECHNOLOGY

(75) Inventor: Richard Gong, Middlesex, NJ (US)

(73) Assignee: LG Electronics Inc., Seoul (KR)

( * ) Notice: Subject to any disclaimer, the term of this patent is extended or adjusted under 35 U.S.C. 154(b) by 920 days.

(21) Appl. No.: 09/800,928

(22) Filed: Mar. 8, 2001

(65) Prior Publication Data

US 2002/0056103 A1    May 9, 2002

Related U.S. Application Data

(60) Provisional application No. 60/197,400, filed on Apr. 14, 2000.

(51) Int. Cl.
  *G06F 3/00* (2006.01)
  *G06F 13/00* (2006.01)
  *H04N 5/445* (2006.01)

(52) U.S. Cl. .......................................... 725/50; 725/39
(58) Field of Classification Search .................. 725/50, 725/54, 39; 348/564, 567
See application file for complete search history.

(56) References Cited

U.S. PATENT DOCUMENTS 6,271,893 B1 * 8/2001 Kawaguchi et al. ........ 348/725
6,314,571 B1 * 11/2001 Ogawa et al. ................. 725/48
6,507,950 B1 * 1/2003 Tsukidate et al. .............. 725/54
6,606,748 B1 * 8/2003 Tomioka et al. ............... 725/50
2001/0050598 A1 * 12/2001 Mourant et al. ......... 331/117 R
2003/0208760 A1 * 11/2003 Sugai et al. ................... 725/50
2004/0205817 A1 * 10/2004 Soma et al. ................... 725/50

OTHER PUBLICATIONS

Moseley et al., "Mastering Microsoft Office 97 Professional Edition", 1996, pp. 464-468.*

* cited by examiner

*Primary Examiner*—Chris Kelley
*Assistant Examiner*—Usha Raman
(74) *Attorney, Agent, or Firm*—Birch, Stewart, Kolasch & Birch, LLP

(57) ABSTRACT

Technology that allows the party who generates schedule information, e.g., television schedule information used as a basis for meta data, to easily and efficiently "overrun" a selected event by a user-defined number of minutes and also to select the number of downstream events that will be shifted as a result of the overrun is disclosed. Also, the end time of the overrunning and the start and end times of the user-selected number of downstream events can be automatically recalculated and rescheduled. The new start and end times can then be reviewed by the generating user before being committed to the meta data that will be included in the television signal, e.g., a digital multiplex television signal.

26 Claims, 7 Drawing Sheets

| | Date | Start | End | Event Name | Description | Rating | CC | Ste... |
|---|---|---|---|---|---|---|---|---|
| 159 | April 24 | 17:00 | 17:30 | NBA Showtime | | | ☐ | ☐ |
| 160 | April 24 | 17:30 | 20:00 | NBA Basketball | The New York Knicks vs. the Miami Heat, live from Madison Square Garden. | TVPG | ☑ | ☐ |
| 161 | April 24 | 20:00 | 20:30 | Jeopardy! | | | ☑ | ☐ |
| 162 | April 24 | 20:30 | 21:00 | Wheel of Fortune | | | ☑ | ☐ |
| 163 | April 24 | 21:00 | 21:30 | America's Dumbest Criminals | Courteous car thief, dope in a garbage bin, deli robber makes a sandwich | | ☐ | ☑ |
| 164 | April 24 | 21:30 | 22:00 | Siskel & Ebert | "Pushing Tin", "eXistenZ", "Lost & Found", "Election", guest critic Harry Knowles | TVPG | ☑ | ☐ |
| 165 | April 24 | 22:00 | 22:30 | Game Warden Wildlife Journal | Snowmobilers in Idaho, relocating bison, eels in Maine | | ☐ | ☐ |
| 166 | April 24 | 22:30 | 23:00 | U.S. Olympic Gold | | | ☐ | ☐ |
| 167 | April 24 | 23:00 | 23:30 | News | | | ☑ | ☐ |
| 168 | April 24 | 23:30 | 01:00 | Saturday Night Live | | TV14 | ☑ | ☑ |

Fig. 2.

| | Date | Start | End | Event Name | Description | Rating | CC | Ste.. |
|---|---|---|---|---|---|---|---|---|
| 159 | April 24 | 17 00 | 17 30 | NBA Showtime | | | ☐ | ☐ |
| 160 | April 24 | 17:30 | 20:10 | NBA Basketball | The New York Knicks vs. the Miami Heat, live from Madison Square Garden. | TVPG | ☑ | ☐ |
| 161 | April 24 | 20 10 | 20.40 | Jeopardy! | | | ☑ | ☐ |
| 162 | April 24 | 20 40 | 21 10 | Wheel of Fortune | | | ☑ | ☐ |
| 163 | April 24 | 21.10 | 21.40 | America's Dumbest Criminals | Courteous car thief, dope in a garbage bin., deli robber makes a sandwich | | ☐ | ☑ |
| 164 | April 24 | 21 40 | 22.10 | Siskel & Ebert | "Pushing Tin", "eXistenZ", "Lost & Found", "Election", guest critic Harry Knowles | TVPG | ☑ | ☐ |
| 165 | April 24 | 22·10 | 22 40 | Game Warden Wildlife Journal | Snowmobilers in Idaho, relocating bison, eels in Maine | | ☐ | ☐ |
| 166 | April 24 | 22 40 | 23.10 | U S Olympic Gold | | | ☐ | ☐ |
| 167 | April 24 | 23 10 | 23.30 | News | | | ☑ | ☐ |
| 168 | April 24 | 23 30 | 01 00 | Saturday Night Live | | TV14 | ☑ | ☑ |

Fig. 5

EVENT OVERRUN AND DOWNSTREAM EVENT SHIFT TECHNOLOGY

This application claims priority under 35 U.S.C. § 119 upon U.S. provisional patent application, Ser. No. 60/197,400, filed Apr. 14, 2000, the entire contents of which are hereby incorporated by reference.

FIELD OF THE INVENTION

The invention is directed generally to electronic television program guides, and more particularly, to technology that can handle program overrun and downstream program shifting so as to update the electronic program guide.

BACKGROUND OF THE INVENTION

Electronic program guides are known. They originated either with analog cable television technology or digital satellite television technology, and their availability has increased with the advent of digital cable television technology and digital terrestrial broadcast television. In its most basic form, the electronic program guide is superimposed upon a television screen in the form of a grid having rows that correspond to television channels and columns that correspond to 30 minute intervals between the hours and half hours of the day. Using (typically) a remote control, a television viewer can navigate through the electronic program guide to determine what programs are being broadcast at times of interest to the viewer.

In general, an electronic program guide is formed from data embedded in the television signal (meta data). Changes in the programming schedule that are determined far in advance of the effected program's(s') time(s) of broadcast can usually be incorporated into the data included within the television signal so that the electronic program guide does not depict scheduling information that is inconsistent with what is actually being televised at that moment. But if the changes to the schedule concern programs that are to be shown, i.e., have time slots, soon after the program currently being shown, then the known electronic program guide technology cannot quickly and easily update the schedule information displayed to the viewer. Consequently, a situation occurs in which the schedule displayed to the viewer via the electronic program guide generated by the television receiver is inconsistent with what is currently being shown on the television.

An example of this problem will be discussed. In the Fall season, on Sunday afternoons in the United States, it is typical for professional football games to be televised. Some of the games begin at 1:00 p.m. Eastern Standard Time (EST) while others begin at 4:00 p.m. EST. One of the television signal providers, the Columbia Broadcast System (CBS), also broadcasts a very popular news program, "Sixty Minutes," beginning at 7:00 p.m. EST. Depending upon the length of the late afternoon football game (i.e., that starts at 4:00 p.m.) being televised by CBS, there might be an opportunity in that 3 hour window to televise a local news program between the end of the late afternoon football game and the beginning of the "Sixty Minutes" program. Often, however, the late afternoon football game, e.g., because of a sudden death overtime situation, takes all or more of the three hours to complete.

When this occurs, CBS continues to broadcast the late afternoon football game. The local CBS affiliate will typically eliminate its local news broadcast. And if the late afternoon football game extends past 7:00 p.m., the local CBS affiliate will typically delay the start time at which it broadcasts the "Sixty Minutes" program.

Unfortunately, there is no way to predict whether the game might run long until the game actually extends into the fourth quarter of the football game at the very earliest. Further, if the game will extend into the sudden death overtime scenario, that can only be determined as of the game's end of regulation time. Accordingly, any changes to the program schedule that ideally would be reflected in the data used to form the electronic program guide occur too close in time to the effected event (e.g., the "Sixty Minutes" program) for those changes to be encoded at the part of the digital television system that sends the data to the viewer's decoding television equipment.

As a result, a user tuning to the CBS television signal is presented with a professional football game that is either very late into its fourth quarter or is in the midst of sudden death overtime. Yet when the viewer accesses the electronic program guide, the viewer is presented with information that indicates either that the local news is currently being broadcast or that the "Sixty Minutes" news program is currently being broadcast.

SUMMARY OF THE INVENTION

The invention, in part, represents a solution to the problem in the background art discussed above.

The invention, in part, provides technology that permits changes in the event (e.g., program) schedule to be quickly reflected in the data included in a television signal so that circuitry in a television receiver which generates an electronic program guide can display accurate schedule information despite the occurrence of unexpected, last moment changes to the schedule.

The invention provides, in part, technology that allows a user at the transmitting end of a television signal to identify an event that will run longer than originally scheduled (thus "overrunning" its originally-scheduled end time), to quickly adjust the overrunning event's end time, and to automatically shift a user-selected number of subsequent events by the same amount of time as the overrun. For example, again, if a football game being broadcast goes into overtime, the local television signal provider will need to edit the schedule data during the end of the game to reflect that the game will overrun its originally-scheduled end time, and then quickly decide how many downstream events will be shifted in terms of their start and end times. The invention, in part, provides technology that makes this possible to achieve and implement the schedule changes quickly and easily.

The invention also, in part, provides technology that allows the party who generates schedule information, e.g., television schedule information used as a basis for meta data, to easily and efficiently "overrun" a selected event by a user-defined number of minutes and also to select the number of downstream events that will be shifted as a result of the overrun. Then, the end time of the overrunning and the start and end times of the user-selected number of downstream events can be automatically recalculated and rescheduled. The new start and end times can then be reviewed by the generating user before being committed to the meta data that will be included in the digital multiplex television signal.

In the particular example of terrestrial digital television, for a user of schedule data generating equipment according to the Background Art to be able to make a high-impact change to schedule data under urgent or even frantic circumstances (such as an unexpected overtime situation in a professional football game), the user must have a reasonably deep understanding of the American Television Standards Committee (ATSC) A/65 Standard in order to issue query-like commands to change specific fields in the program and system information protocol (PSIP) data tables that comprise the schedule information. Individual commands would have to be issued for the overrunning event as well as each subsequent event that would be shifted as a result of the overrun. Depending on the amount of the overrun, error-prone calculations would have to be made by the operator to derive the new start and end times of each of the shifted downstream events. Thus, in the Background Art, for such a last-minute change to being accurately reflected in the electronic program guide, there must be a reasonably highly trained operator of the schedule-generating equipment present who is willing to work under significantly stressful conditions given the great likelihood that he/she will make at least one error due to the large number of individual calculations and query-like commands that must be generated.

The invention, also in part, makes it possible for last-minute schedule changes to be implemented in the data that is included in the digital multiplex television signal, easily and with much less stress. The invention makes it possible, particularly in the circumstance of digital terrestrial television that makes use of the A/65 Standard, for an operator with almost no knowledge of the A/65 Standard to update the schedule information armed simply with an instruction to "overrun the football game by 20 minutes and shift the next three events after that." With no more than four or five mouse clicks, the task can be accomplished, the new start and end times can be automatically and accurately derived, and the new piece of data encoded and provided to the broadcast stream, i.e., the digital television multiplex.

The invention, in part, provides a computer-implemented method of automatically updating television schedule data for a plurality of serially-scheduled events telecast on the same channel, each event having a starting time and a duration, the method comprising: selecting a first one of the events that will extend beyond a scheduled duration thereof; identifying a second one of the events as being the last one of a subset of the events for which starting times will be effected by the overrun of the first event; and automatically updating schedule information data for each of the subset of events based upon information about the overrun. The invention, also in part, provides a computer-readable article of manufacture having embodied thereon a computer program comprising a plurality of code segments to perform such a method. Similarly, the invention, in part, provides an event and system information protocol (PSIP) generator operable to carry out such a method.

The telecast mentioned above can be a digital television broadcast such as a terrestrial broadcast, and more particularly one that is compliant with the American Television Standards Committee (ATSC), where each event is a program, and the schedule data is PSIP data.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

FIG. 2 is an image of one of the screens of a graphical user interface (GUI) generated by the PSIP data generator according to the invention.

FIG. 5 is a variation of the screen of FIG. 2.

DETAILED DESCRIPTION OF THE PREFERRED EMBODIMENTS

Figure 1:
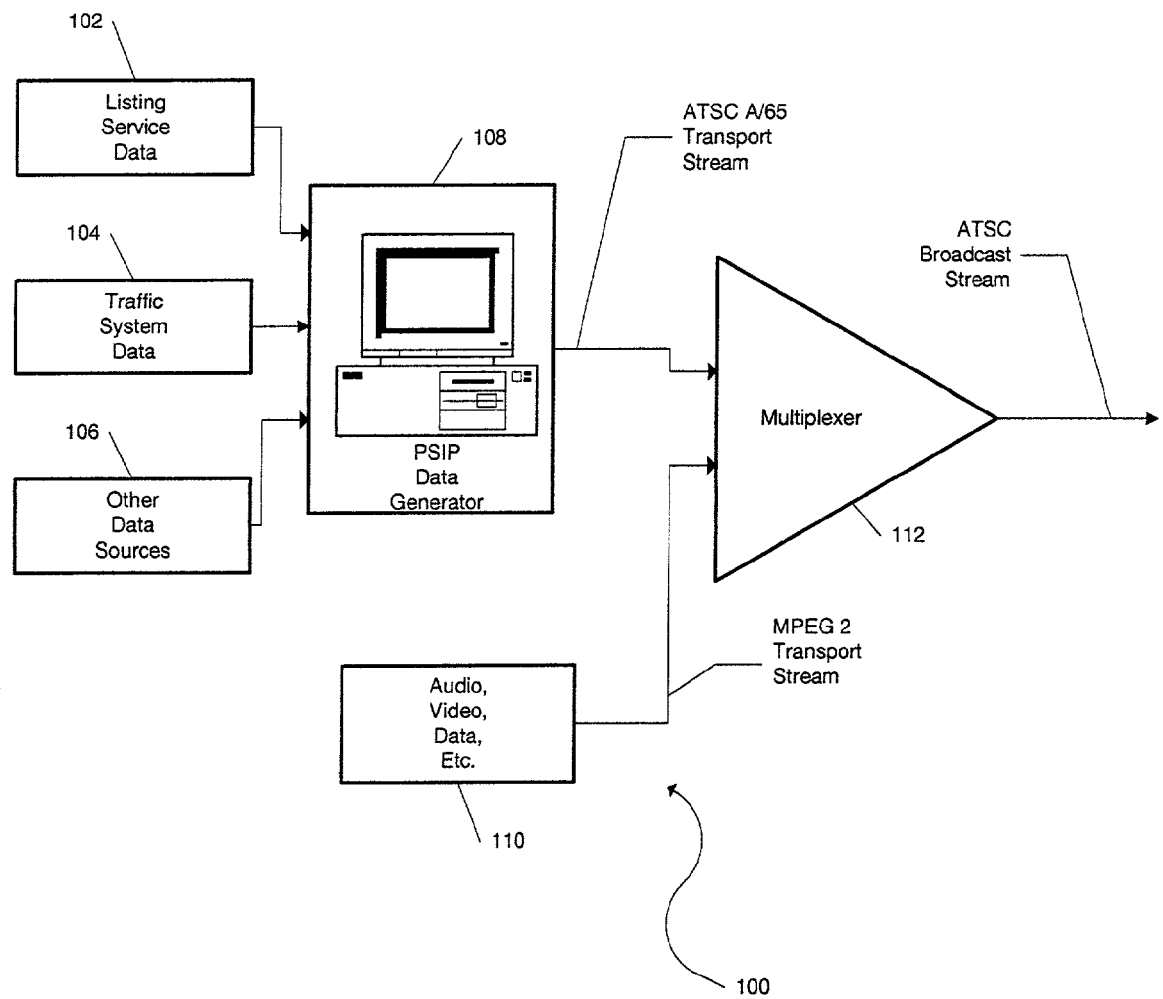
FIG. 1 is a block diagram depicting an event overrun and downstream event shift technology according to the invention in the contest of a digital television broadcast stream generation environment.

FIG. 1 is a block diagram depicting an event overrun and downstream event shift technology according to the invention in the context of a digital television broadcast stream generation system.

In FIG. 1, the digital television broadcast stream generation system 100 includes: a source 102 of listing service data; a source 104 of traffic system data; one or more sources 106 of other data; a program and system information protocol (PSIP) data generator 108; one or more sources 110 of audio packets, video packets, data packets, etc.; and a multiplexer 112.

The event overrun and downstream event shift technology is implemented by adapting a well known PSIP generator 108 according to the discussion herein. An example of a known PSIP generator is the PSIP BUILDER PRO brand of PSIP generator manufactured and sold by TRIVENI DIGITAL INC. The PSIP BUILDER PRO itself is based upon a programmed PC having a Pentium type of processor. The software can be written in the Java language. The other blocks of FIG. 1 correspond to known technology.

Figure 7:
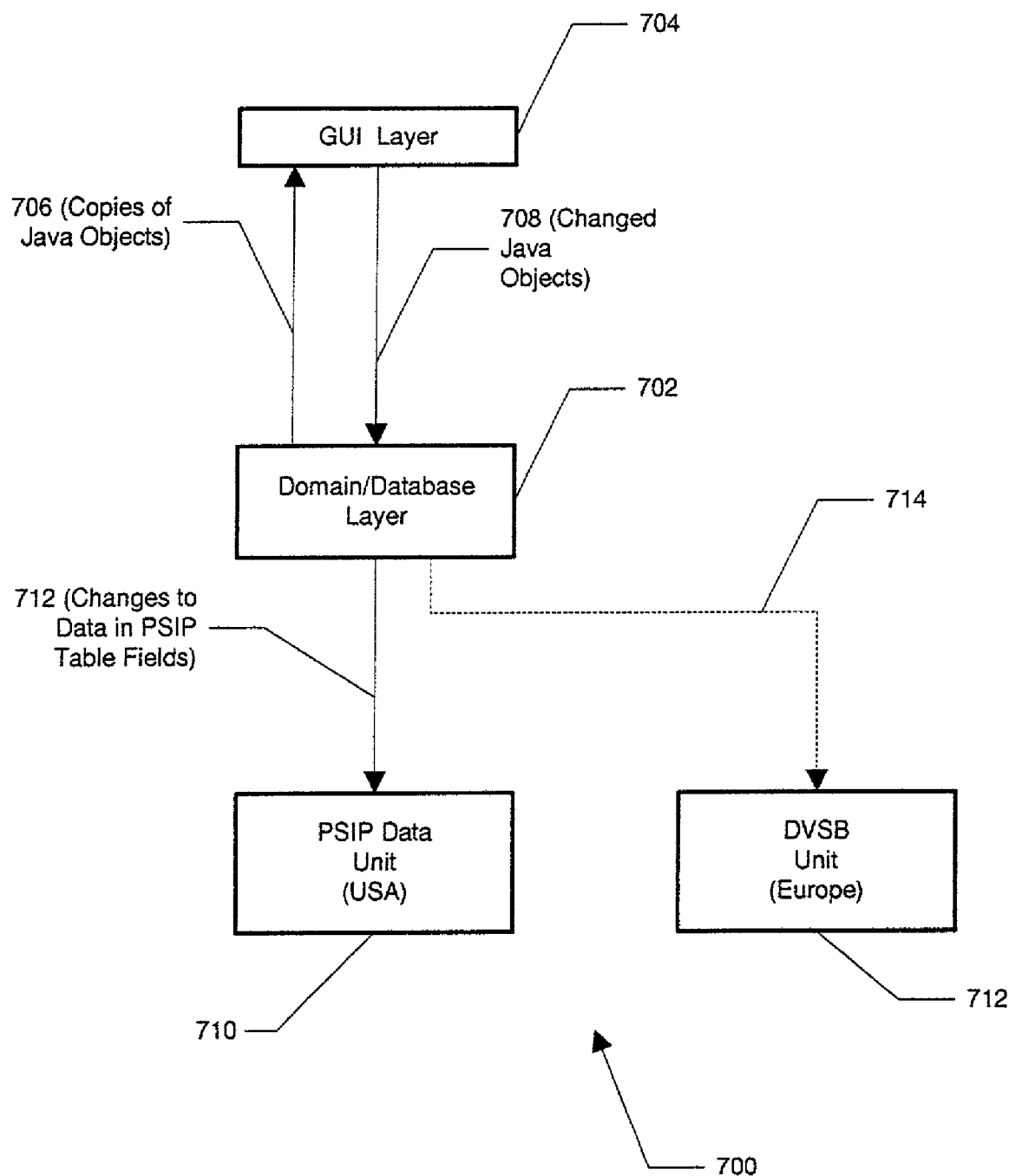
FIG. 7 is a block diagram representation of the layer architecture of the PSIP data generator according to the invention.

Generally, as depicted in FIG. 7, the known PSIP generator 108 (upon which the invention is an improvement, as discussed herein) maintains two domains: the digital television (DTV) domain (corresponding to the database layer 702): and the ATSC A/65 domain (within the PSIP data unit 710). The ATSC A/65-compliant domain contains A/65-compliant data structures, such as the EIT according to the PSIP standard. The DTV domain is similar to the models for digital television proposed by JavaTV and others. The PSIP generator 108 allows operators to manipulate schedule information in the DTV domain and then transform (map) it automatically to the ATSC A/65 domain. An advantage of this approach is that the translation could alternatively be to the DVSB domain adopted in Europe.

In FIG. 1, the invention has been depicted in the context of a digital television broadcast such as a terrestrial broadcast, and more particularly one that is compliant with the Advanced Television Standards Committee (ATSC), where each event is a program, and the schedule data is PSIP data. However, the invention is readily applicable to any television format, e.g., analog terrestrial, analog cable, digital cable, satellite, etc., for which an electronic schedule is maintained and corresponding data is sent to a receiver for the purpose of presenting an electronic program guide (EPG) to a viewer.

The operation of FIG. 1 will be discussed. The multiplexer 112 combines a Motion Picture Experts Group (MPEG) 2 transport stream containing video, audio, data, etc. from one or more sources thereof 110 with an ATSC A/65 compliant transport stream from the PSIP data generator 108 to form an ATSC broadcast stream. As is known, the ATSC A/65 transport stream contains meta data used by a receiver (not depicted) of the ATSC broadcast stream (from the multiplexer 112) to reconstruct the video, audio, data, etc. in which the user of the receiver is interested. The PSIP generator 108 generates the ATSC A/65 transport stream from originating sources 102, 104 and 105 of raw information on which meta data is based.

In addition, as is known, the receiver (not shown) can use the meta data to construct an EPG. And, of course, it is known for the PSIP generator 108 to generate the particular meta data representing the EPG. But as discussed in detail in the section above, entitled "Background of the Invention," the Background Art is not capable of quickly and easily dealing with an event overrun and associated shifts in downstream events. The invention solves that problem in the form of an improved PSIP generator 108, as will be described in more detail below.

A detailed example of how the PSIP generator 108 according to the invention operates will be presented. This example is set in the context of a typical scenario (different than discussed above in the section, entitled "Background of the Invention,") for using the Event Overrun function (according to the invention) in a broadcast station environment.

Suppose that an NBA game between the NY Knicks and Miami Heat is scheduled to be broadcast from 5:30 PM to 8:00 PM. At approximately 10 minutes before 8 PM, it becomes apparent that the game is going to run over by 5 or 10 minutes. Also suppose that, because the game has important implications for the upcoming NBA playoffs, the network (e.g., the National Broadcasting Company (NBC)) has instructed its local affiliates to broadcast the game in its entirety. This instruction will necessitate changing the scheduled end time of the event, and shifting the start and end times of one or more program events which immediately follow the game. These changes must then be encoded to the PSIP tables which accompany the digital broadcast stream.

The non-delayed program event schedule appears as shown in FIG. 2 on the display of the PSIP generator 108. The NBC affiliate decides to change the scheduled end time of the game from 20:00 (8:00 PM) to 20:10 (8:10 PM). In examining the program schedule which follows the basketball game, the decision is made by the user of the PSIP generator 108 to also broadcast all programs prior to the 11 PM News in their entirety, and to shorten the 11 PM News (event #167) by 10 minutes, allowing "Saturday Night Live" (event #168) to start at its regularly scheduled time. Thus, the start and end times of the 6 programs which follow the basketball game will have to be shifted ahead by 10 minutes. This task is easily accomplished by using the Event Overrun function according to the invention.

Figure 3:
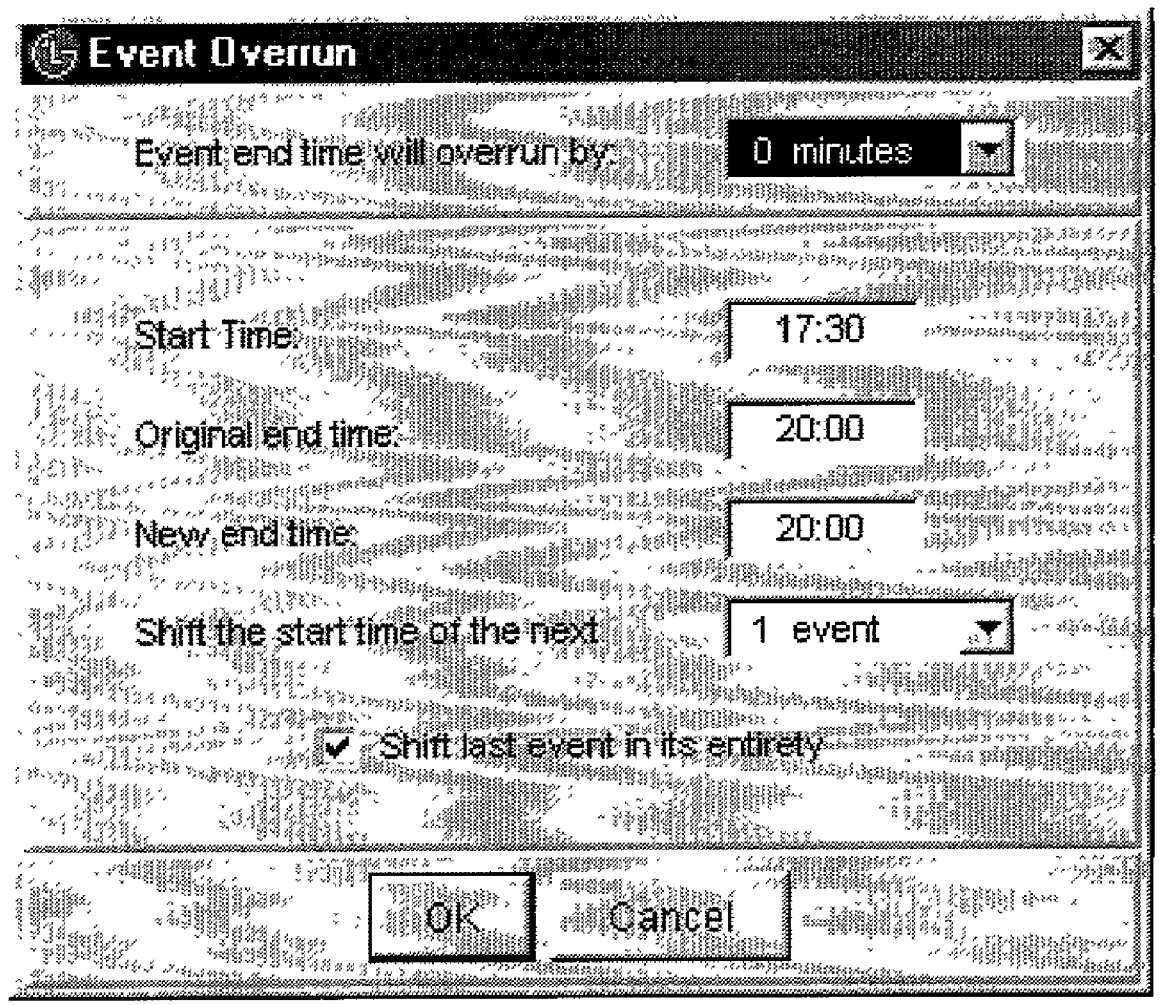
FIG. 3 is an image of a dialog window within a screen of a graphical user interface (GUI) generated by the PSIP data generator according to the invention.

The Event Overrun function is invoked, e.g., by clicking on the toolbar button, which looks like a clock. This action opens the dialog window of FIG. 3. In this dialog window, only 2 parameters need to be specified by the operator to accomplish the task described above. First, the amount by which the event (in this case, the basketball game) will overrun is specified (e.g., 10 minutes). Second, the number of downstream events which are to be shifted due to the overrunning is also specified (e.g., six).

Figure 4:
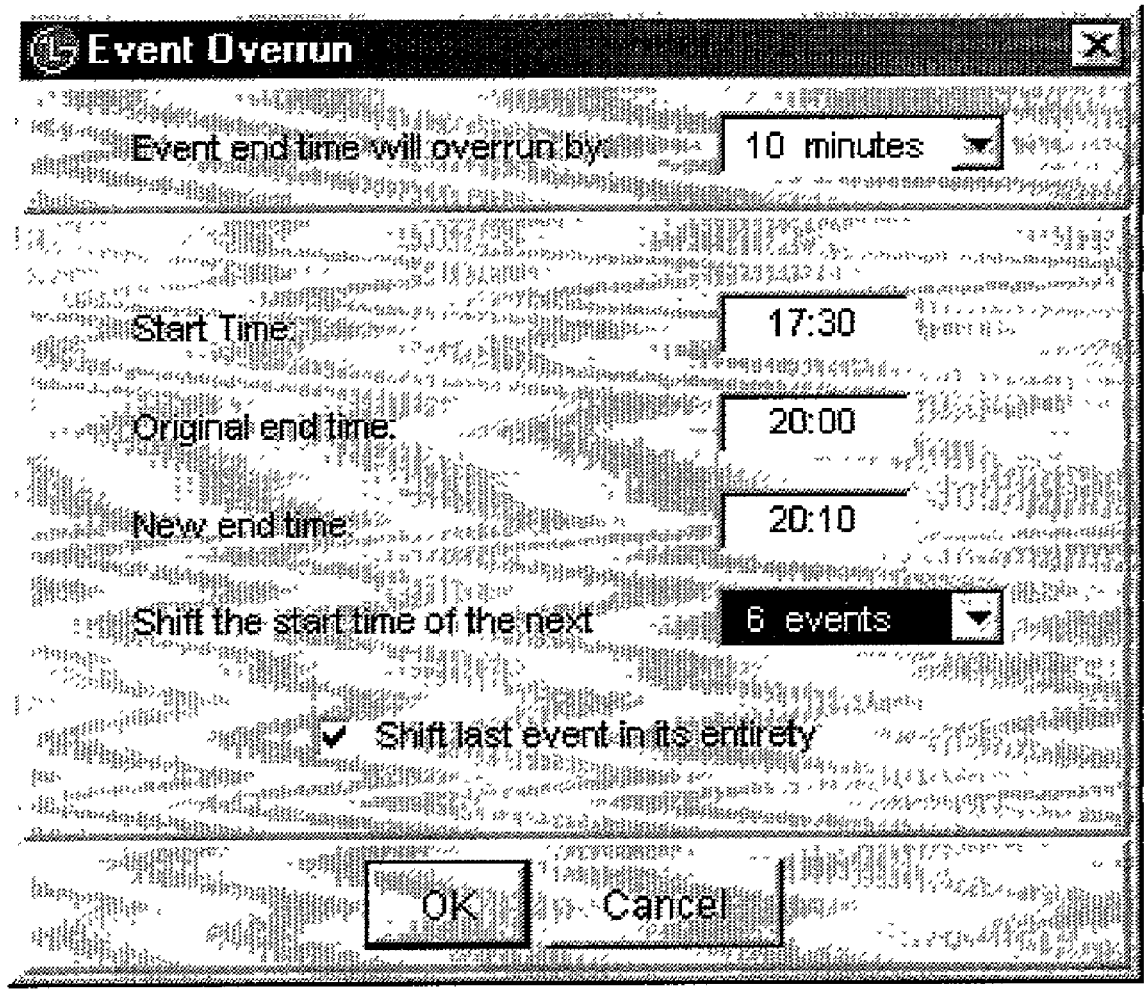
FIG. 4 is a variation of the screen of FIG. 3.

Once these values have been specified according to the requirements of the task, the Event Overrun dialog window will appear as in FIG. 4.

When the operator clicks on the OK button, the end time of the basketball game is adjusted, and the start and end times are automatically adjusted for the 6 events which follow the game, as shown in the revised program schedule of FIG. 5.

It is noted that the option in FIG. 4, "Shift last event in its entirety," has been depicted as being checked. As the name implies, this causes the last of the identified total of events (e.g., 6 in FIG. 4) to be shifted in its entirety, i.e., not truncated. The event following the sixth event, i.e., the seventh event, can be truncated by being joined while in progress as a default. Alternatively, the default can be to truncate the seventh event's end time. Further in the alternative, the Event Overrun window of FIG. 4 can be adapted to allow the user to check an option to "Join next unshifted event in progress." If the "Shift last event in its entirety" option were not checked, then the last (sixth in FIG. 4) effected event would be truncated by being joined while in progress.

One of ordinary skill would understand that there are alternative ways to collect the needed schedule change information. For example, the user can be requested to provide the total number of events that will be shifted in their entirety with the assumption that the next event will be truncated, and requested to decide whether the next event will be joined in progress or have its end truncated.

Figure 6:
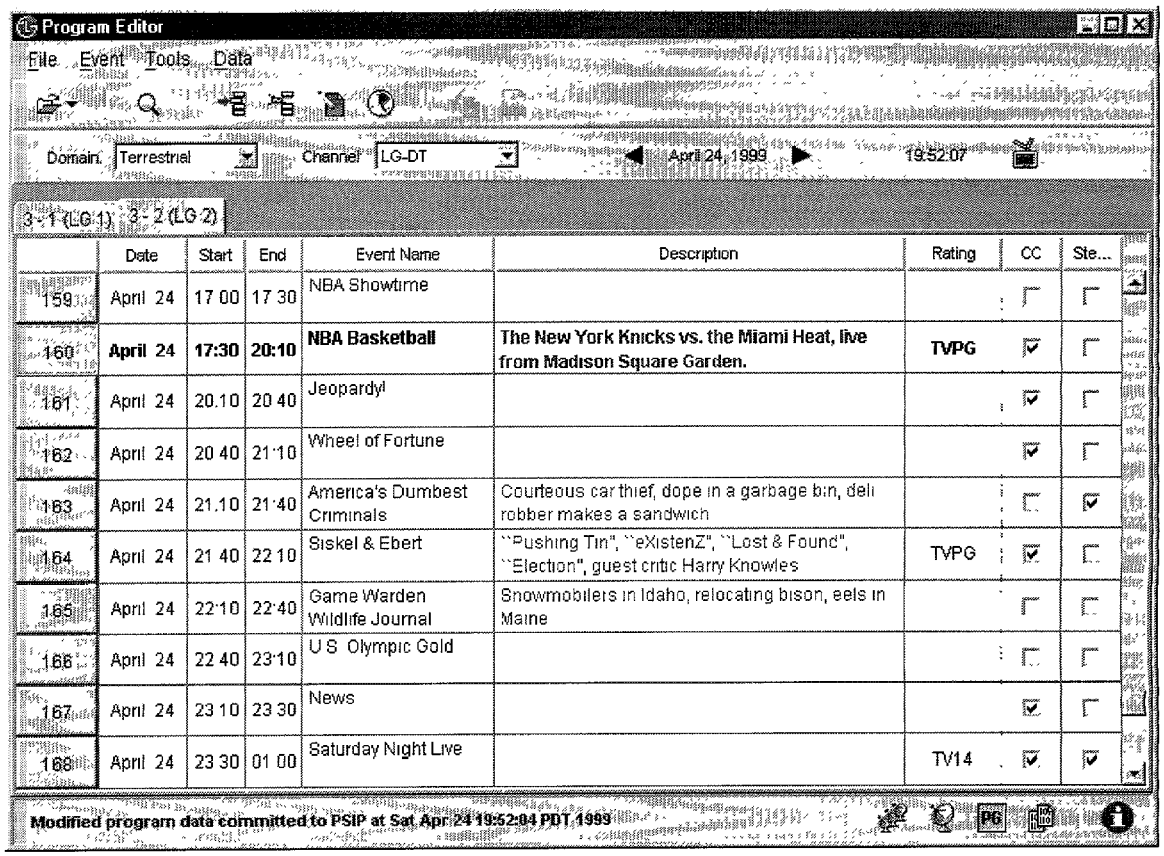
FIG. 6 is another variation of the screen of FIG. 2.

Finally, the changes to the start and end times must be encoded to the PSIP tables which accompany the broadcast stream. This is accomplished by simply clicking on the toolbar button which looks like ✓🗐. The Program Editor then displays a message at the bottom of the window informing the operator that the modifications to the event schedule have been "committed" to the PSIP tables and are now going out in the broadcast stream. In addition to the adjusted start/end times, the confirmation message is shown (at the bottom) in FIG. 6.

The algorithm implied by the discussion of FIGS. 2–6 is as follows. Step 1: Identify the event that overruns. Step 2: Identify the amount of overrun. Step 3: Identify the number of subsequent events that are to be shifted. Step 4: Derive the new end time for the selected event. Step 5: Treat the new end time of the selected event, $E_1$, as the new start time for the next subsequent event, $E_{1+J}$. Step 6: Iteratively determine end and start times for the remaining events. The algorithm assumes that no gaps between events or overlaps between events are permitted. And the algorithm also assumes that the duration of an event cannot be changed except for the event being truncated, e.g., such as the seventh event in the discussion of FIG. 4.

As depicted in FIG. 7, the PSIP generator 108 maintains a database, or database layer, of Java objects 702 representing the schedule of events, e.g., programs, for multiple channels corresponding to multiple network broadcasters. The PSIP generator 108 generates a graphical user interface (GUI) (or GUI layer) 704, e.g., corresponding to that depicted in FIGS. 2–6. Copies of selected ones of the Java objects contained in the database layer 702 are used to form the GUI layer 704, as depicted by the signal 706.

The database layer 702 is organized to promote efficiency of transmission of data representing schedule information in the digital broadcast stream. In contrast, the GUI layer 704 is organized to promote easy visual understanding of the channel schedule(s) by intuition.

When a user changes the event schedule via the Event Overrun function (a GUI dialog window for which is depicted in FIG. 4), so long as the user has not clicked the OK button, the changes are made only to the copies of the Java objects in the GUI layer 704. Once the OK button in FIG. 4 is clicked, then the changed copies of the Java objects in the GUI layer 704 are communicated to, and incorporated into, the database layer 702, as depicted by the signal 708. This is analogous to changing a file name in the Windows operating system. There, the file name can be changed at the GUI level, but the underlying layer is not changed until the operating system receives a carriage return. In other words, the change at the GUI level can be aborted without effecting the underlying layer if the operating system receives an escape character or if the operator clicks on a cancel button.

At this point, the database layer 702 has been updated but the PSIP data unit has not been presented with the changes, hence the updated schedule information has not been put into the digital broadcast stream. When the user wants to have the changes put into the digital broadcast stream, i.e., when the user wants to commit to the changes, he can click on the toolbar button which looks like ✓🗎, as described above. This will cause effected PSIP tables to be overwritten with changed information.

In particular, a type of PSIP table effected by such changed schedule information is the event information table (EIT). And within the EIT, usually the event_id field and the start_time field are overwritten, and often the length_in_seconds field is overwritten as well. The updated PSIP tables can by output by the PSIP data unit 710 (within the PSIP generator 108) at their regularly scheduled intervals, respectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A computer-implemented method of automatically updating television schedule data for a plurality of serially-scheduled events telecast on the same channel, each event having a starting time and a duration, the method comprising:

selecting a first one of said events that will extend beyond a scheduled duration thereof;

providing, upon selection of the first one of the events that will extend beyond the scheduled duration, a graphic user Interface (GUI) including a first field for identifying an amount of the overrun, a second field for identifying the number of said events that will be delayed by the amount of overrun, and a third field for selectively identifying whether a last event of the identified number of events or an event immediately following the last event is to be truncated by the amount of the overrun; and automatically updating schedule information data for each of said subset of events based upon information about said overrun.

2. The method of claim 1, wherein said channel is one of a plurality of channels, the method further comprising:

selecting said one of said plurality of channels; and displaying schedule information about a plurality of events being telecast via the selected channel;

wherein said first event is selected from the plurality of events being displayed.

3. The method of claim 2, wherein for each event, at least the scheduled starting date, starting time and event name are displayed.

4. The method of claim 3, wherein for each event, at least one of the duration and the end time is displayed.

5. The method of claim 2, wherein:

a channel schedule for said selected channel is represented by a database of Java objects, and the displayed schedule information is represented by copies of a subset of said Java objects from said database.

6. The method of claim 5, wherein initially only ones of said copies can be effected by overrun-related schedule changes until said changes are approved by a user, then corresponding Java objects in said database are automatically updated and displayed.

7. The method of claim 6, wherein the telecast is a digital terrestrial television broadcast that is compliant with the Advanced Television Standards Committee (ATSC), each event is a program, and said schedule data is program and system information (PSIP) data, the method further comprising:

overwriting, upon approval by a user, PSIP data corresponding to the updated Java objects.

8. The method of claim 7, wherein the overwritten PSIP data is an event information table (EIT).

9. The method of claim 8, wherein at least one of the following fields, event_id, start_time and length_in_seconds, of the EIT is overwritten.

10. The method of claim 1, wherein, upon selection of the third field, said plurality of serially-scheduled events are each shifted in their entirety such that said second event is also the last one of said plurality of serially-scheduled events to be shifted in its entirety and the event next to last event is truncated, and wherein upon non-selection of the third field, all of said plurality of serially-scheduled events except said second event are each shifted in their entirety such that said second event is truncated by being the first one of said plurality of serially-scheduled events to have the starting time thereof delayed but have the duration thereof truncated so as to preserve a starting time of the event immediately following said second event.

11. The method of claim 7, wherein a default is for the second event to be truncated unless an indication is given that said second event is to be shifted in its entirety.

12. The method of claim 1, wherein a start time for each of said plurality of serially-scheduled events is delayed according to said overrun.

13. The method of claim 9, wherein an end time for each of said plurality of serially-scheduled events except said second event is delayed according to said overrun.

14. The method of claim 10, wherein an end time for said second event also is delayed according to said overrun.

15. The method of claim 1, wherein the telecast is a digital television broadcast.

16. The method of claim 15, wherein said digital television broadcast is a terrestrial broadcast.

17. The method of claim 15, wherein said terrestrial broadcast is compliant with the Advanced Television Standards Committee (ATSC), each event is a program, and said schedule data is program and system information (PSIP) data.

18. The method of claim 1, wherein said subset of events involves at least two serially-scheduled events, excluding said first event.

19. The method of claim 1, wherein the GUI includes a single pop-up window including the first, second and third fields.

20. A computer-readable article of manufacture having embodied thereon a computer program comprising a plurality of code segments to perform the method of claim 1.

21. An event and system information (PSIP) generator operable to carry out the method of claim 1.

22. A method of updating a television broadcast schedule of a plurality of serially-scheduled events for a channel, the method comprising:

selecting a first event that is to be overrun among a plurality of listed events;

providing, upon selection of the first one of the events that will extend beyond the scheduled duration, a graphical user Interface (GUI) including a first field for identifying an amount of the overrun, a second field for identifying the number of said events that will be delayed by the amount of overrun, and a third field for selectively identifying whether a last event of the identified number of events or an event immediately following the last event is to be truncated by the amount of the overrun; and systematically updating a schedule of the serially-schedule events based on the first, second and third fields provided in the GUI.

23. The method of claim 22, further comprising:

updating a program and system information (PSIP) data storage with the updated schedule in response to a user input.

24. The method of claim 23, wherein the updating step updates an event information table (EIT) in the PSIP data storage with the updated schedule.

25. The method of claim 22, wherein the identified number of events is greater than one.

26. The method of claim 22, wherein the GUI includes a single pop-up window including the first, second and third fields.

* * * * *